(12) United States Patent
McCormick (10) Patent No.: US 6,334,766 B1
(45) Date of Patent: *Jan. 1, 2002

(54) TAKEOUT APPARATUS FOR SHUTTLE-TYPE PLASTIC BLOW MOULDING MACHINES

(76) Inventor: John McCormick, 14240 9th Line, R.R. 5, Georgetown, Ontario (CA), L7G 4S5

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,903

(22) Filed: Oct. 9, 1997

Related U.S. Application Data (63) Continuation of application No. 08/580,053, filed on Dec. 22, 1995, now abandoned.

(51) Int. Cl.[7] .................. B29C 49/04; B29C 49/32; B29C 49/70; B29C 49/72
(52) U.S. Cl. .................. 425/165; 425/527; 425/531; 425/534; 425/537; 425/806; 425/436 RM; 425/436 R; 425/444; 425/216; 264/161; 264/536; 264/542; 264/543; 414/751; 414/753; 901/7
(58) Field of Search ................... 264/161, 334, 264/336, 536, 540, 542, 543, 509; 425/537, 150, 531, 534, 436 RM, 444, 436 R, 532, 215, 216, 806; 414/751, 753; 901/7

(56) References Cited

U.S. PATENT DOCUMENTS

| | | | |
|---|---|---|---|
| 3,060,497 A | * 10/1962 | Boyer | |
| 3,417,428 A | 12/1968 | Rupert | 269/542 |
| 3,910,741 A | * 10/1975 | Mehnert | 425/302 B |
| 3,954,186 A | * 5/1976 | Hafele | 425/436 R |
| 4,118,452 A | 10/1978 | Myers et al. | 264/542 |
| 4,124,668 A | 11/1978 | Frohn | 264/542 |
| 4,153,408 A | 5/1979 | Albert et al. | 425/534 |
| 4,155,696 A | 5/1979 | Siard et al. | 425/534 |
| 4,361,531 A | * 11/1982 | Black | 264/161 |
| 4,552,526 A | 11/1985 | Hafele | 425/537 |
| 4,767,311 A | 8/1988 | Gibberneyer | 425/534 |
| 4,886,443 A | * 12/1989 | Klinedinst et al. | 425/537 |
| 4,895,554 A | * 1/1990 | Isamu | 474/141 |
| 5,000,654 A | * 3/1991 | Shiotani | 264/334 |
| 5,112,558 A | * 5/1992 | Schad et al. | 264/297.2 |
| 5,156,798 A | 10/1992 | Bruning | 214/542 |
| 5,597,524 A | * 1/1997 | Powell, Jr. | 264/536 |
| 5,612,603 A | * 3/1997 | Kim | 318/568.11 |
| 6,042,360 A | * 3/2000 | Padovani | 425/403.1 |
| 6,062,845 A | * 5/2000 | Conaway et al. | 425/444 |
| 6,136,254 A | * 10/2000 | Weber | 264/334 |

* cited by examiner

Primary Examiner—Jan H. Silbaugh
Assistant Examiner—Michael I. Poe
(74) Attorney, Agent, or Firm—Bereskin + Parr (57) ABSTRACT

A take-out system for a shuttle-type blow moulding machine having two moulding assemblies has a single gripper head for taking out moulded articles from both moulding assemblies. The gripper head is carried by a vertical gripper arm which can be raised and lowered by a rack and pinion drive with respect to a carriage that moves in line with the two moulding assemblies. Electric servomotors are used to raise and lower the gripper head and move the carriage under software control so that the motion of the gripper head can be programmed to match a particular moulding machine. The articles may be moulded with tabs that can be gripped by the gripper head, and the take-out system may include a trimmer for removing those tabs, and a waste conveyor for the trimmed material.

16 Claims, 9 Drawing Sheets

TAKEOUT APPARATUS FOR SHUTTLE-TYPE PLASTIC BLOW MOULDING MACHINES

CROSS REFERENCE TO RELATED APPLICATIONS

This application is a continuation of Application Ser. No. 08/580,053 filed Dec. 22, 1995 (now abandoned).

FIELD OF INVENTION

This invention relates generally to the art of moulding plastic articles and is concerned more particularly with an apparatus for handling the plastic articles after moulding. An apparatus of this type is referred to in the art as a "take-out" system.

BACKGROUND OF THE INVENTION

The invention is concerned in particular with a take-out system for shuttle-type plastic blow moulding machines. In a shuttle-type blow moulding machine, at least one tubular parison is continuously extruded between two blow moulding assemblies, each of which includes a pair of separable mould parts. The assemblies alternately "shuttle" back and forth between respective moulding positions and a position in which the mould parts close around and sever a portion of the parison from the upstream portion of the parison that is being continuously extruded. The moulding assembly then returns to its moulding position and air is applied to expand the severed portion of the parison into the mould. The mould then opens. A take-out systems is used to remove the moulded articles and deliver them to a discharge position, e.g. on a discharge conveyor. At the time the moulds open, the plastic articles are formed but not completely "frozen" in their final shape. Accordingly, the take-out system must be designed to handle the articles without distorting their shape.

Prior art take-out systems for shuttle-type blow moulding machines typically have two separate gripper heads, each positioned below one of the blow moulding assemblies. The individual gripper heads move up and down in synchronism with the release of moulded articles from the moulding assemblies. In an upper position, each head grips the moulded article or articles released from the particular moulding assembly and then moves down to a release position. Typically, a common conveyor mechanism is provided at the release position for receiving and transporting laterally the articles taken out by the two gripper heads. Since the moulding assemblies operate alternately and the gripper heads accordingly must move up and down alternately, the conveyor mechanism must "wait" until the plastic articles from both gripper heads have been delivered, before the batch of articles can be discharged. In an alternative version of the machine, separate take-off conveyors can be provided for each gripper head, but the conveyors then discharge in opposite directions and the two groups of articles must be brought together downstream, for subsequent handling. There are a number of disadvantages associated with prior art take-out systems. One is that two separate gripper heads and associated actuating equipment is required. Another is that the systems tend to be designed using actuators that move through fixed distances (e.g. air cylinders) so that there is limited adjustability. This means that the systems tend to be quite difficult to set up and require the services of a skilled technician. Also, the systems usually are designed for use with particular types of blow moulding machines and cannot easily be adapted for use with different machines. By way of example, the center-to-center distance between the two moulding assemblies can vary widely from one machine to another. A typical range might be 29" to 40" center-to-center.

An object of the present invention is to provide an improved take-out apparatus that is designed to address these disadvantages of the prior art.

SUMMARY OF THE INVENTION

It will be understood that, as compared with prior art take-out systems, the method of the invention has a number of advantages. First, there is only one gripper head for taking out moulded articles from both moulding assemblies. Further, since the drive means associated for achieving movement in the first and second direction may be infinitely variable, so that there is infinite versatility to control the motion of the gripper head. This means that it is possible to "program" the motion of the gripper head as appropriate to the particular application, and that the apparatus as a whole can be adjusted to fit different positions of the moulding assemblies that might be found in different moulding machines.

According to a particular preferred embodiment the drive means for the carriage on the first linear guide may, comprise an endless belt to which the carriage is coupled, and an electric servomotor for reciprocating the belt. Similarly, an electric servomotor may be used to drive a rack and pinion arrangement which includes a vertically adjustable arm, for infinitely varying the vertical displacement of the gripper head. The use of electric servomotors in turn allows for computer control of the apparatus. For example, by using appropriately designed software, the motion of the carriage along the first linear guide means and the gripper head on the second linear guide means may be automatically controlled from a computer terminal.

The software can be designed to allow the operator to simply input co-ordinates or distances to program the motion of the gripper head. For example, the carriage will be required to alternately move different linear distances along the first guide means to position the gripper head between the two moulding assemblies of the moulding machine. In order to achieve as short a cycle time as possible, it may be desirable to program the drive means so that they both operate at the same time and move the gripper head in an arcuate path in travelling between the two article engaging positions below the mould assemblies and the release position. Different release positions can be provided for articles from the respective moulding assemblies.

In summary, the use of infinitely variable drive means, coupled with appropriate software control can provide the operator with complete freedom to program all aspects of the motion of the gripper head.

The method of the invention may also include trimming excess plastic material from the moulded article prior to discharge.

BRIEF DESCRIPTION OF DRAWINGS

In order that the invention may be more clearly understood, reference will now be made to the accompanying drawings which illustrate a particular preferred embodiment of the invention by way of example, and in which.

DESCRIPTION OF PREFERRED EMBODIMENT

Figure 1:
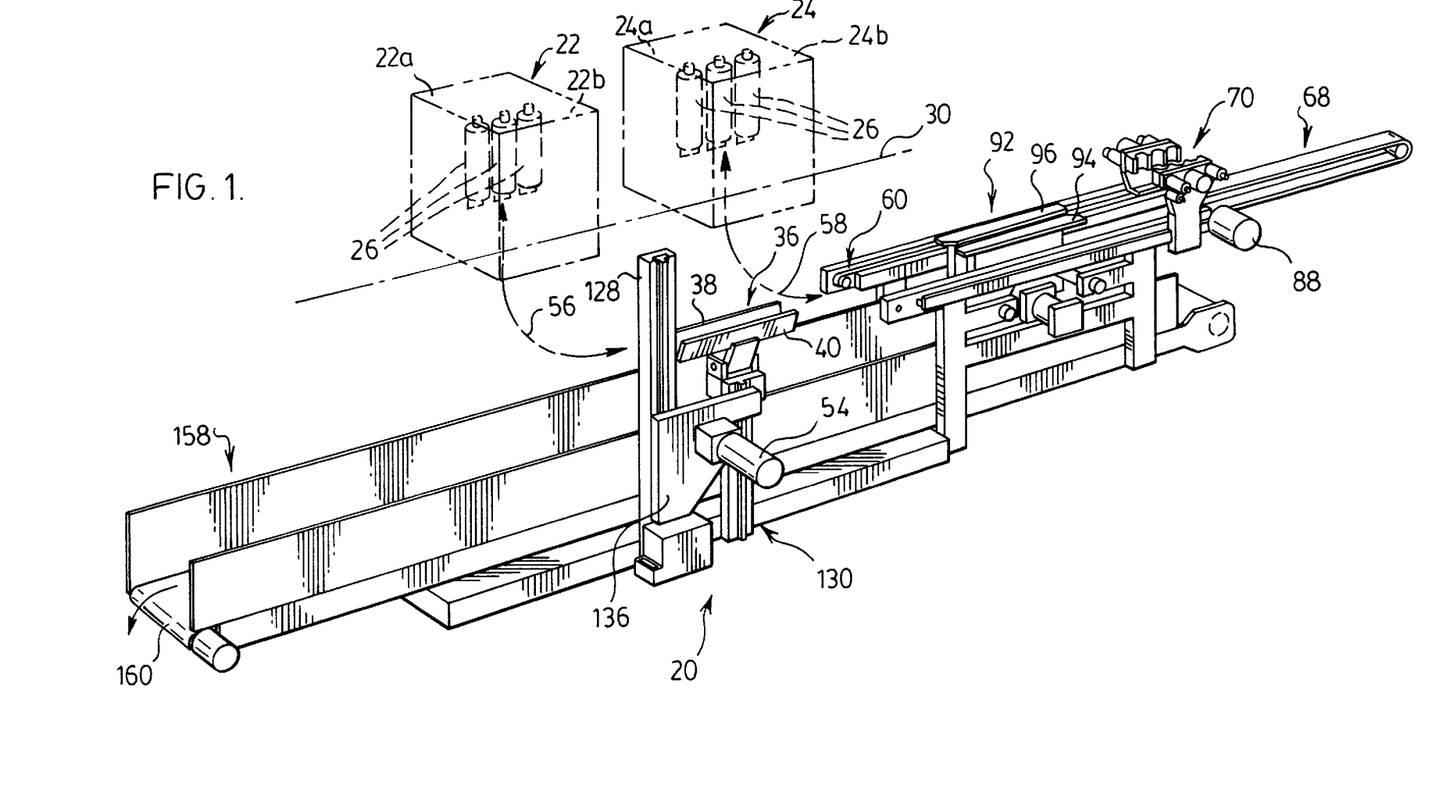
FIG. 1 is a perspective view of a take-out system in accordance with the invention, shown in association with two moulding assemblies of a blow moulding machine, which are indicated in phantom.
Figure 7:
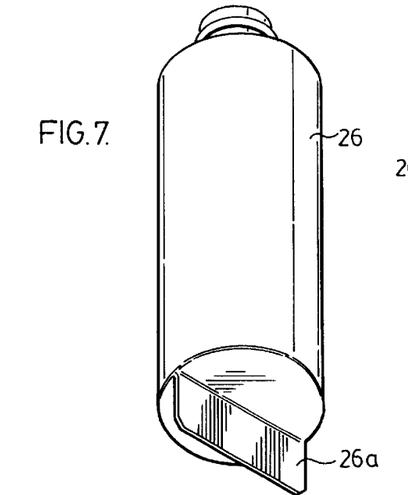
FIG. 7 is a perspective view from below showing one of the plastic articles (a bottle) as released from the mould.
Figure 8:
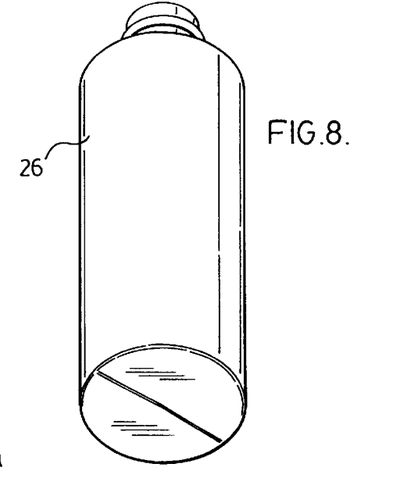
FIG. 8 is a view similar to FIG. 7 showing the bottle after trimming.

Referring first to FIG. 1, a take-out apparatus is generally indicated by reference numeral 20 and is shown in association with first and second moulding assemblies 22 and 24 respectively of a blow moulding machine. The machine itself is not shown since it is not part of the present invention and is conventional. For purposes of illustration, the two moulding assemblies have been shown as designed for producing plastic moulded bottles 26, in groups of three. One of the bottles is shown individually in FIG. 7, from which it will be seen that the bottle is moulded with a diametral tab 26a extending downwardly from its bottom face. The gripper head of the apparatus (to be described) engages this tab during the take-out operation and the tab is subsequently trimmed off so that the finished bottle appears as shown in FIG. 8.

Figure 2:
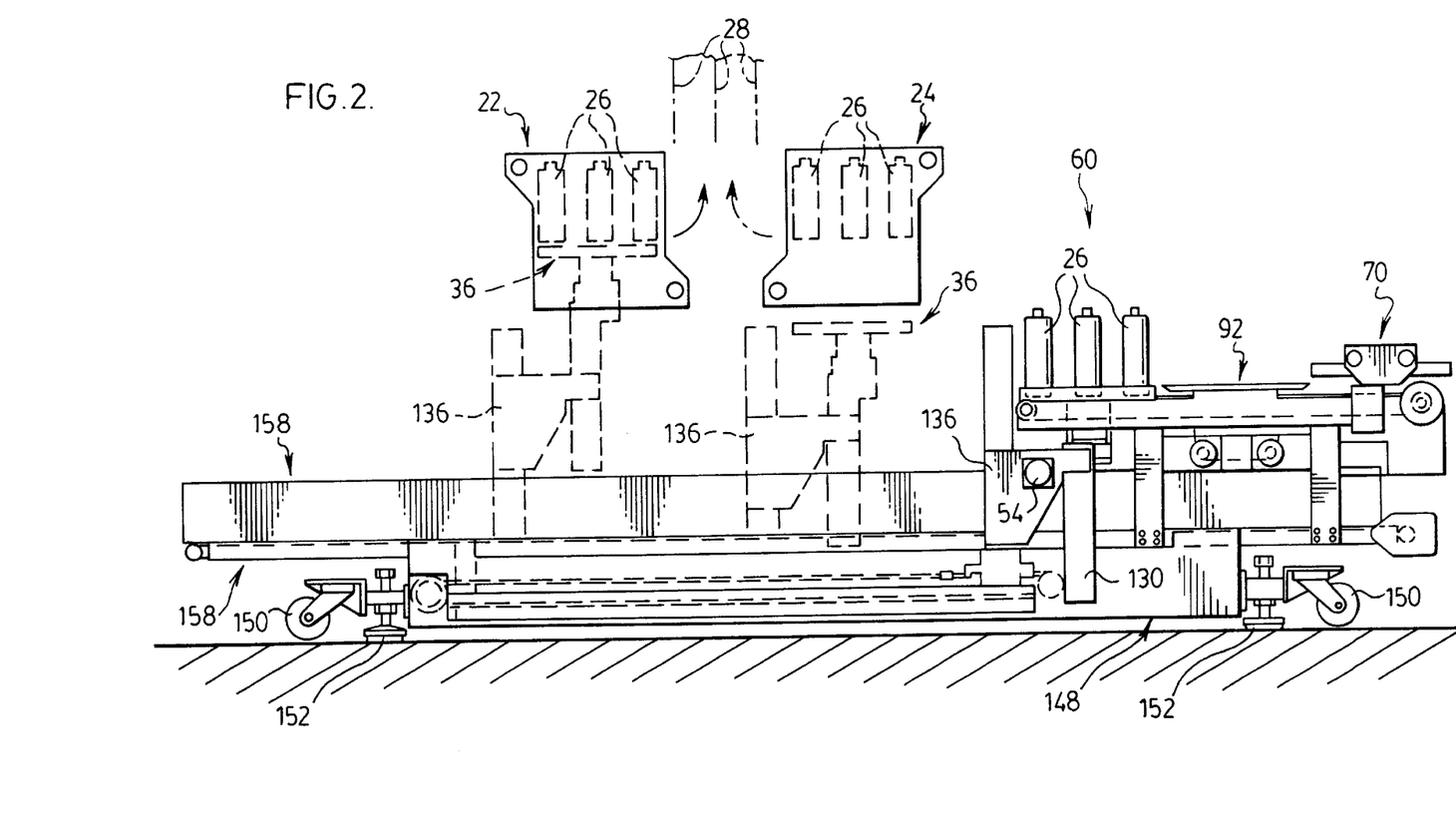
FIG. 2 is a front elevational view corresponding to FIG. 1, showing the gripper head in a discharge position.

Referring to FIG. 2, the bottles are formed by a conventional blow moulding technique from three tubular parisons 28 that are continuously extruded at a location between the two moulding assemblies. The two assemblies alternately "shuttle" back and forth between the moulding positions in which they are shown and the position in which the particular assembly engages and severs sections from each of the three parisons. Air is then supplied to the interior of each parison to expand the parison to the shape of the mould, forming a bottle. Though not shown in detail, it will be understood that each of the moulding assemblies 22 comprises two mould parts (denoted 22a and 22b and 24a and 24b) in FIG. 1 which open and close to engage and sever the parisons. After the parisons have been expanded and the bottles formed, the mould parts open when the moulding assemblies are in the moulding positions shown, releasing the bottles downwardly.

Reverting to FIG. 1, it will be seen that the two moulding assemblies 22 and 24 are disposed in positions which are spaced from one another along a defined axis, denoted 30. The spacing (indicated by the break lines in FIG. 3) of course allows room for the two moulding assemblies to move inwardly to engage the parisons.

In accordance with the invention, a single gripper head 36 is provided for taking out the moulded bottles from both of the moulding assemblies 22,24. It can be seen from FIG. 1 that the gripper head has a pair of jaws 38, 40 in the form of a pair of rectangular plates that extend horizontally and parallel to one another. The plates are shown in FIG. 1 in an open position but can be closed to engage the tabs 26a at the bottoms of the moulded bottles, thereby effectively gripping the bottles.

Figure 5:
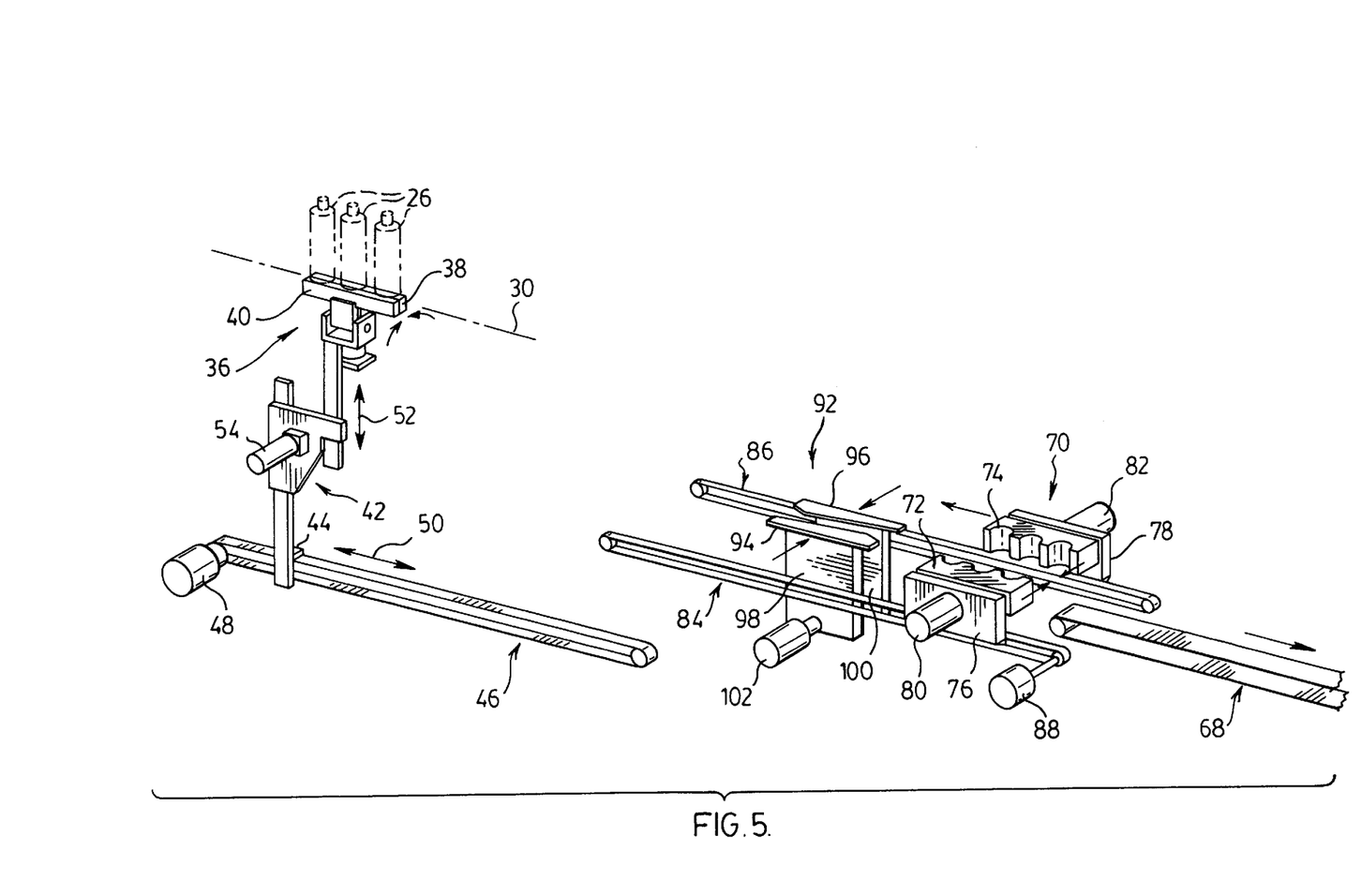
FIG. 5 is a further diagrammatic illustration showing a trimming step.

Referring now to FIG. 5 by way of general explanation, the two jaws 38, 40 are shown in this closed position, holding three bottles from one of the moulding assemblies. The gripper head is carried at the upper end of a gripper arm assembly generally denoted 42 and the assembly is carried in turn by a carriage generally denoted 44 attached to the top run of an endless belt 46. An electric servomotor 48 drives one of the pulleys around which the endless belt extends. Belt 46 provides the first linear guide means referred to previously and is oriented to move the carriage in a first direction which is denoted by arrow 50 in FIG. 5 and which extends parallel to the defined axis 30 between the two moulding assemblies. The gripper arm assembly 42 provides the second linear guide means referred to previously (to be described in detail later) and is arranged to move the gripper head 36 in a second, generally vertical direction indicated by arrow 52. A second electric servomotor 54 is provided for operating the gripper arm assembly 42.

It will be appreciated that, by appropriately controlling the two motors 48 and 54 it is possible to provide for an almost infinite variation in the position of the gripper head 36 within the design constraints of the apparatus. As indicated previously, the servomotors (and other actuators to be described) can be software controlled from a computer terminal to tailor the motion of the gripper head to the particular blow moulding machine being served.

Figure 3:
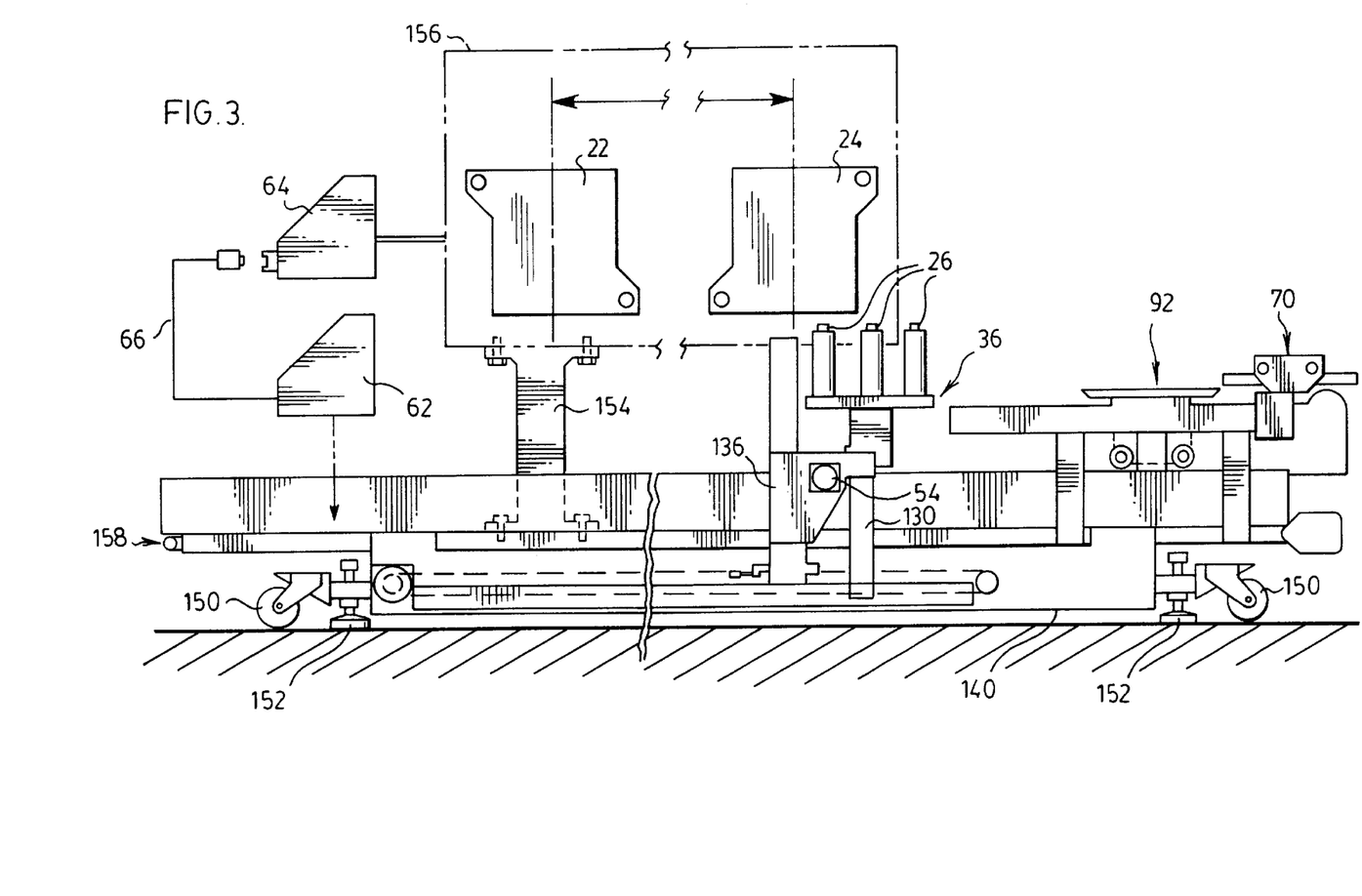
FIG. 3 is a view similar to FIG. 2 showing the gripper head in an intermediate position adjacent one of the two moulding assemblies.
Figure 4A:
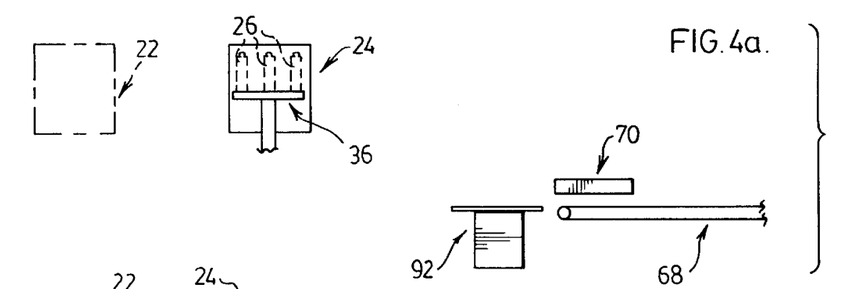
FIG. 4 comprises four diagrammatic views denoted respectively (a) to (d) illustrating the sequence of operation of the apparatus.
Figure 4B:
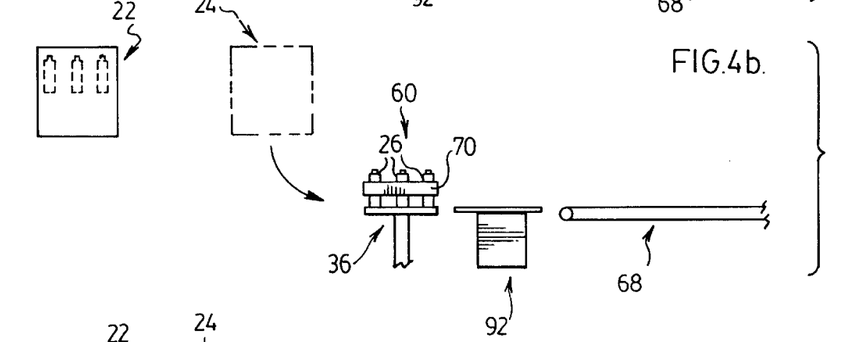
Figure 4C:
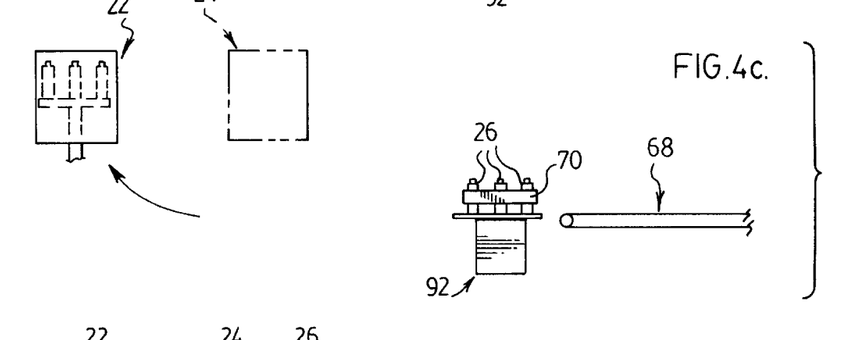
Figure 4D:
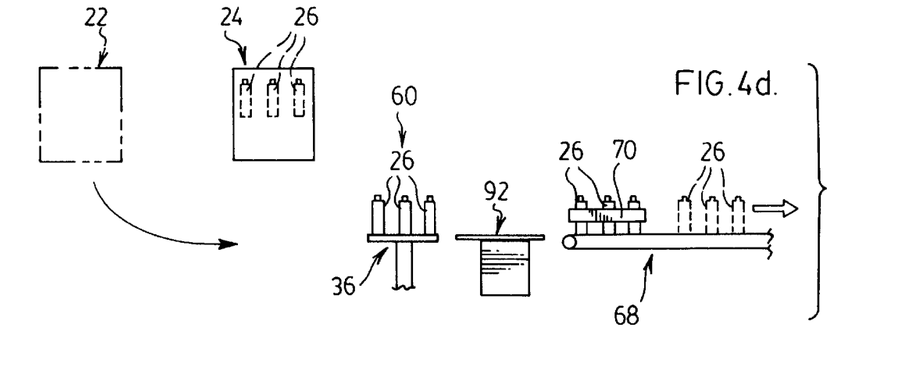

By way of example, the two dotted arrows denoted 56 and 58 in FIG. 1 indicate generally the motion of the gripper head assembly as it takes out groups of bottles alternately from the two moulding assemblies 22 and 24 and delivers the bottles to a release position, which is generally indicated at 60. It has been found in practice that, while the gripper head should follow the general paths indicated by the arrows 56 and 58, improvements in cycle time can be achieved if those paths are modified somewhat. For example, in serving the moulding assembly 22, it might be desirable to raise the gripper head 36 earlier than indicated by arrow 56, and then move the gripper head horizontally to a position below the moulding assembly before moving it further upwards. In practice, it has been found desirable to move the gripper head to a position immediately below each moulding assembly while the mould is closed, momentarily hold the gripper head in that position and then move the head upwardly into its final position as the mould opens and the bottles are released. Clearly, this requires precise synchronization between the blow moulding machine and the take down system. By way of illustration, the moulding machine and the take-down system can be integrated as shown in FIG. 3 by providing a computer terminal 62 for controlling the take out system and a corresponding terminal 64 for the moulding machine, with an appropriate interface 66 between the two terminals. The software for controlling the take-out system can be designed so that the motion of the gripper head is automatically set for the particular moulding machine when interface 66 is plugged into terminal 64.

Reverting to the general description with reference to FIG. 5, the apparatus of the invention also includes provision for trimming off the tabs 26a at the bottoms of the bottles 26 between the bottle release position 60 and a discharge conveyor 68 which carries the bottles away from the apparatus. During the trimming operation, the bottles are held in a bottle clamping mechanism generally denoted 70. Mechanism 70 includes a pair of clamping heads 72 and 74 which are formed with recesses to closely match the shapes of the bottles (so as to avoid any damage). The heads 72 and 74 are carried by respective carriages 76 and 78 which are fitted with air cylinders 80 and 82 coupled to the respective heads 72 and 74 so that the heads can be moved between the open positions in which they are shown in FIG. 5 and closed positions in which they engage and clamp the bottles. The carriages 76 and 78 are in turn mounted on respective endless belts 84 and 86 which extend in spaced parallel positions in line with the direction 50 in which the gripper head moves. A single servomotor 88 connected to a common drive shaft (not shown) is provided for driving the two belts.

This arrangement allows the bottle clamping mechanism to be moved back and forth between the position in which it is shown in FIG. 5 in which the two clamping heads 72 and 74 have moved apart for releasing the bottles onto the discharge conveyor 68, and a bottle clamping position co-incident with the gripper head release position 60. In other words, as the bottles are released by the gripper head 36 at position 60, the clamping mechanism 70 "takes over" and clamps the bottles before moving them to the right in FIG. 5, towards the discharge conveyor 68.

A trimmer mechanism 92 is provided at a trimming position between release position 60 and discharge conveyor 68 and comprises a pair of cutters 94 and 96 carried by supports 98 and 100 which are movable towards and away from one another under the control of respective air cylinders 102 and 104.

The servomotor 88 controlling the belts 84 and 86 is programmed to cause the bottle clamping mechanism 70 to pause at the location of the trimmer 92. The respective air cylinders 102 and 104 then move the cutters 94 and 96 in to trim off the bottle tabs 26

FIG. 4 diagrammatically illustrates the sequence of operation. In FIG. 4(a), the gripper head 36 has gripped a batch of bottles in the moulding assembly 24. The bottle clamping mechanism 70 is shown in a position above the discharge conveyor 68, as having just released a preceding batch of bottles. FIG. 4(b) shows the bottles at the gripper head release position 60 with the clamping head 70 engaging the bottles. In FIG. 4(c), the gripper head 36 has moved to a position to take down bottles from the moulding assembly 22 and the bottle clamping mechanism 70 has moved the preceding batch of bottles to the trimmer 92 for trimming of the tabs 26a. Finally, in FIG. 4(d) the bottles that were being trimmed in the preceding view have been deposited on the discharge conveyor 68 and the next set of bottles from moulding assembly 22 have been delivered to the bottle release position 60. The bottle clamping mechanism 70 will then return to position 60 ready to take the next batch of bottles to the trimmer.

Figure 6:
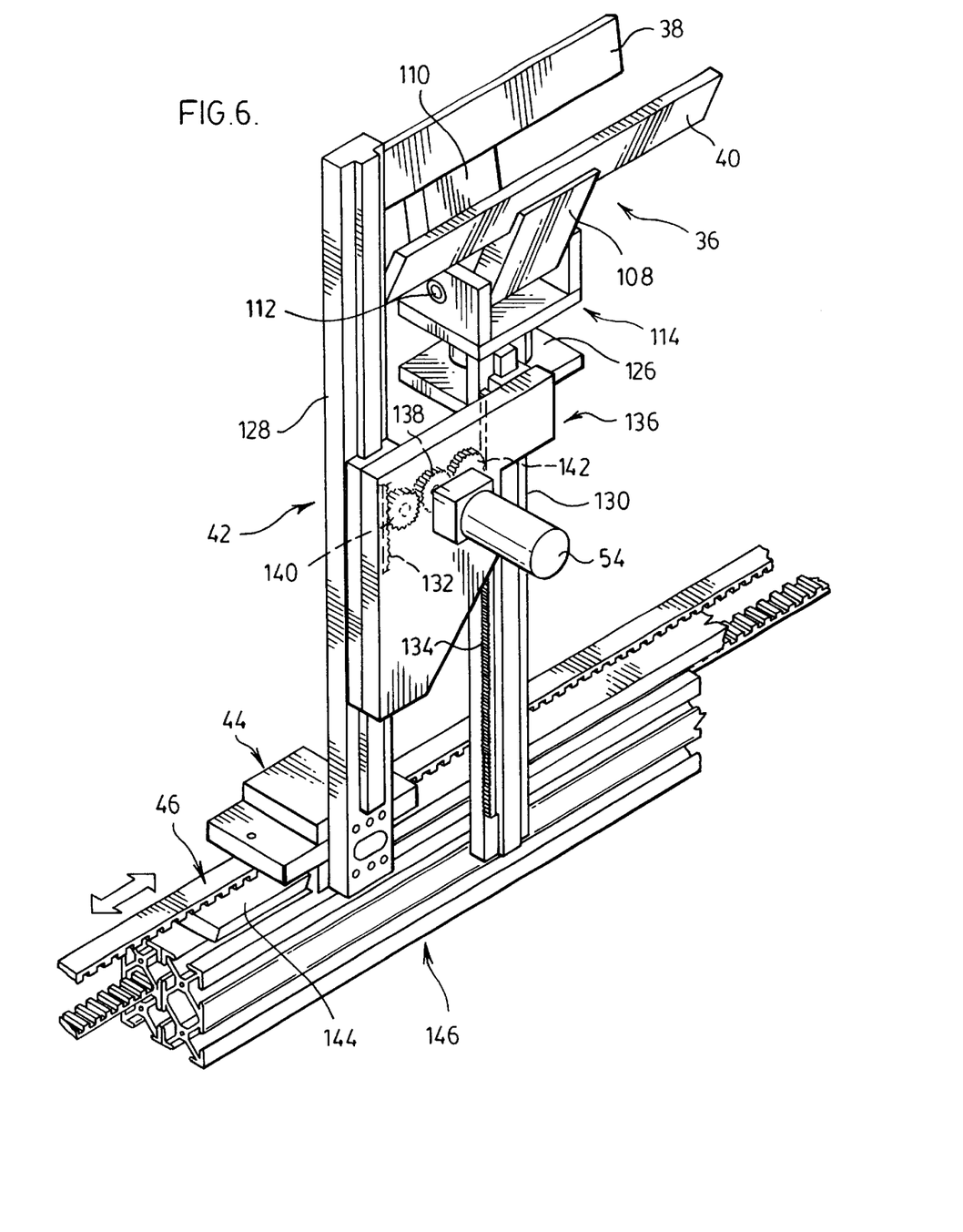
FIG. 6 is a detail perspective view of the gripper head and associated gripper arm assembly.

Referring now to FIG. 6, the gripper head 36 and the gripper arm assembly 42 will be described in detail.

Figure 9:
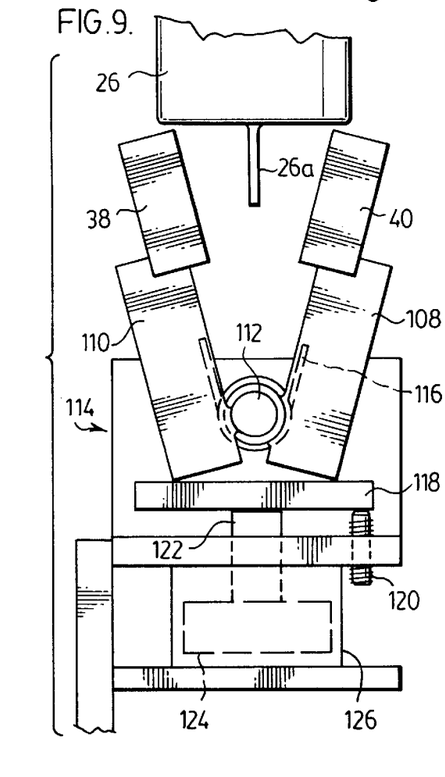
FIGS. 9 and 10 are end elevational views showing the gripper head respectively in open and closed positions.
Figure 10:
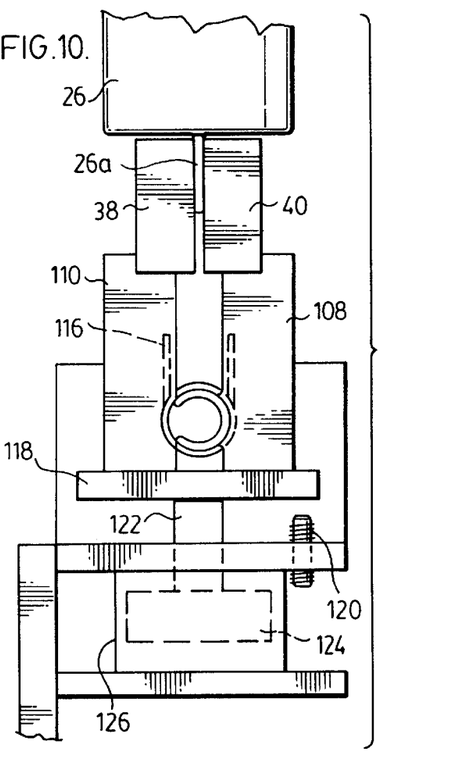

As noted previously, the gripper head has a pair of jaws 38 and 40 which can be moved between open and closed positions and which are shown in their open position in FIG. 6. The jaws are carried by respective arms 108, 110 which are mounted on a pivot shaft 112 extending between the limbs of a generally U-shaped bracket 114. As best shown in FIGS. 9 and 10, a torsion spring 116 is mounted on shaft 112 and acts on the respective arms 108 and 110 to bias the jaws 38, 40 towards their open position. The open position is defined by a plate 118 which rests against an adjustable stop 120. Plate 118 is in turn carried by a shaft 122 which is coupled to the piston 124 of an air cylinder 126. When the cylinder is actuated, the piston 124 moves up to the position shown in FIG. 10, which causes the plate 118 to in effect "cam" the arms 108, 110 inwardly, closing the jaws. When the air supply is terminated, spring 116 returns the jaws to their open positions.

Referring back to FIG. 6, the gripper arm assembly 42 that carries the gripper head 36 is shown in some detail. The assembly is essentially a double rack and pinion mechanism which is designed to provide for high speed up and down movement of the gripper head. A first arm 128 extends vertically upwardly from the carriage 44 and a second arm 130 (the "gripper arm") extends vertically downwardly from the gripper head 36, parallel to arm 128. The arms carry respective racks 132 and 134 having oppositely (inwardly) facing respective sets of teeth. The electric servomotor 54 for raising and lowering the gripper head is mounted on a bracket 136 that is slideably coupled to the respective arms 128 and 130. A first pinion 138 driven by motor 54 meshes with respective driving pinions 140 and 142 that mesh with the respective racks 132 and 134. Thus, if motor 54 drives pinion 138 in the clockwise direction as seen in FIG. 6, the other two pinions will move counterclockwise. Since rack 132 is fixed, the effect will be to drive the bracket 136 upwards with respect to arm 128. Similarly, rotation of pinion 142 in the counterclockwise direction will cause the rack 134 and hence the arm 130 to move up. For each revolution of the driving pinion 138, bracket 136 will move up by an amount equal to the circumference of the pinion (assuming that all three pinions are the same size). Relative to bracket 136, arm 130 will move up a similar amount. However, because bracket 136 has moved, the movement of the gripper head 36 relative to carriage 44 will be twice the circumference of pinion 138. Of course, downward movement of gripper head 36 is accomplished in the reverse fashion.

Carriage 44 is mounted on an undercut guide 144 that is mounted in turn on an extrusion 146. The guide 144 and the extrusion 146 are positioned to essentially define the first direction of movement of carriage 44 represented by arrow 50 in FIG. 5. The carriage is bolted to the top run of the endless belt 46 also described in connection with FIG. 5 and the lower run of the belt (denoted 46(a) in FIG. 6) runs in a passageway defined by the extrusion. It can be seen from FIG. 6 that belt 46 is a toothed belt; pulleys around which the belt runs at opposite ends are of course correspondingly toothed and one of those belts is driven by the servomotor 48 referred to in FIG. 5.

Referring to FIGS. 2 and 3, it will be seen that the take-out apparatus is carried by a frame which is generally denoted 148. The frame has wheels, two of which are indicated at 150, so that the apparatus can be maneuvered and positioned as appropriate. Vertically adjustable feet 152 are associated with the wheels so that the frame can be raised slightly off the wheels when the apparatus is installed in its position of use. A bracket indicated at 154 in FIG. 3 is provided so that the frame can be bolted to the frame of the blow moulding machine (generally indicated in ghost outline at 156). This ensures that the blow moulding machine and the take-out apparatus are maintained in appropriate relative positions once the takeout apparatus has been set up with respect to the machine.

FIGS. 2 and 3 show that the bottle clamping mechanism 70 and the tab trimmer 92 are also carried by the same frame and therefore maintained in correct positions relative to the remainder of the apparatus.

Figure 11:
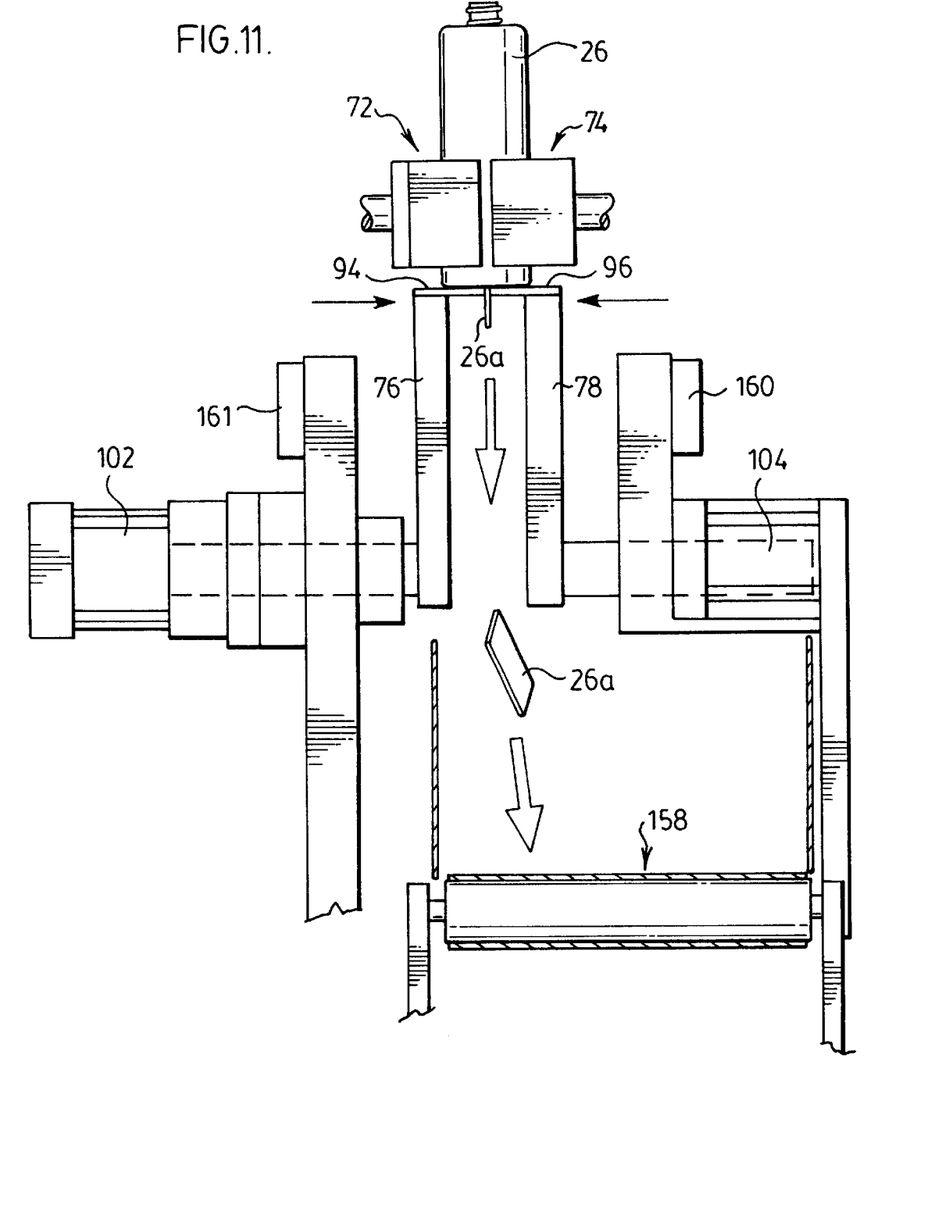
FIG. 11 is an end elevational view illustrating the trimming step.
Figure 12:
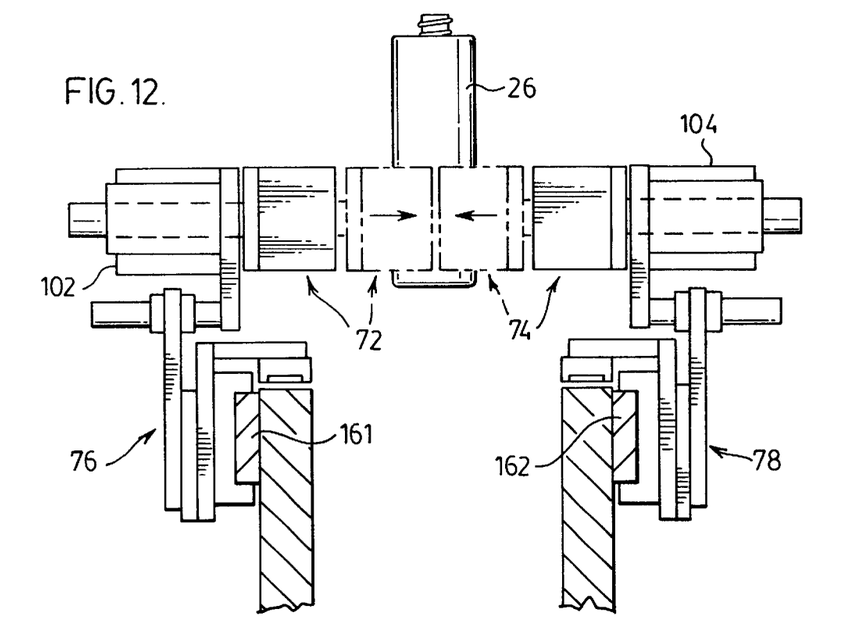
FIG. 12 is a view similar to FIG. 11 showing a bottle being conveyed to a discharge conveyor following the trimming step; and, FIG. 13 is a view similar to FIG. 12 showing a bottle as having been delivered onto a discharge conveyor.
Figure 13:
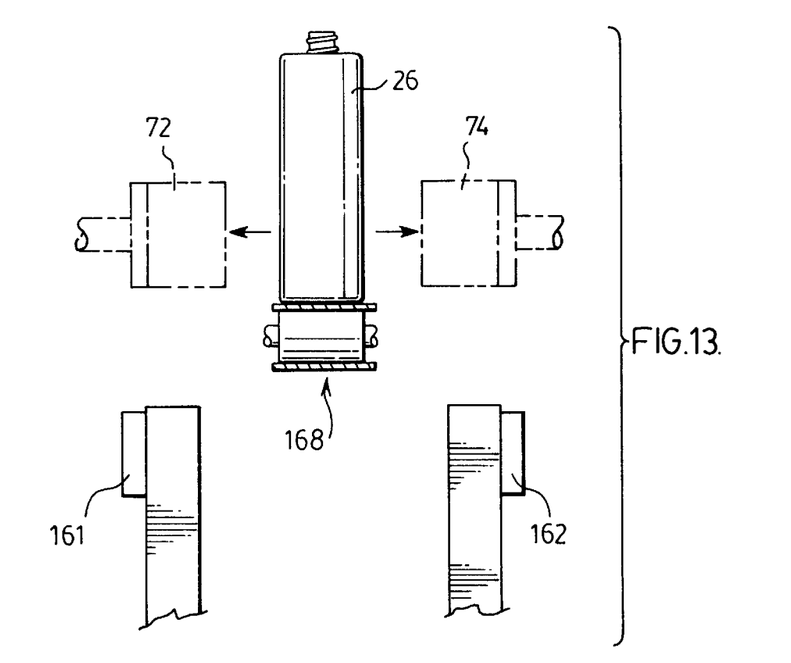

FIGS. 11 to 13 show details of parts of the apparatus that have previously been described in general terms, and it is believed that further detailed description is unnecessary. Briefly, FIG. 11 shows the step of trimming the tabs 26a from the bottoms of the bottles 26. In FIG. 11, one bottle is shown in position for trimming and a tab 26a from a previous bottle is shown falling down between the plates 98 and 100 that carry the respective cutters 94 and 96, onto a waste conveyor 158. The waste conveyor 158 extends from below the trimmer to the left as shown in FIG. 1, and below the mould assemblies 22 and 24 and has a discharge end 160 at the extreme left-hand end of the take-out apparatus as drawn. Waste plastic material trimmed from the bottles in the mould assemblies also falls onto the conveyor so that all of the waste is conveyed away together and can be collected.

Reverting to FIG. 11, cutter 96 essentially acts as an "anvil" against which cutter 94 works. The air cylinder 104 associated with cutter 96 is significantly smaller than the corresponding air cylinder 102 for cutter 94 and moves through a much smaller stroke. When a bottle is in position for trimming, cutter 96 advances towards the tab 26a through only a small incremental amount and then stops. Cutter 94 then advances to actually sever the tab 26a, by working against cutter 96.

FIG. 12 shows details of the clamping mechanism 70 and in particular the fact that the carriages 76 and 78 for the clamping heads 72 and 74 and the associated air cylinders 80 and 82 run on respective guides 161 and 162 mounted on the frame of the apparatus, providing for smooth back and forth travel of the clamping heads 72 and 74 from the bottle release position 60 to the position at which the bottles are deposited on the discharge conveyor 68.

FIG. 13 illustrates diagrammatically retraction of the clamping heads 72 and 74 to allow the bottles to be carried away by the conveyor.

It should of course be understood that the preceding description relates to a particular preferred embodiment of the invention and that many modifications are possible, some of which have been indicated and others of which will be apparent to a person skilled in the art. It should be noted in particular that while particular types of drive means have been described for the various components of the apparatus, the precise form of actuator used in each case may vary. It is important, however, that the drive means used to move the carriage 44 in the first linear direction 50 and also the drive means for raising and lowering the gripper head be infinitely variable to allow for appropriate control of the motion of the gripper head.

It should also be noted that, while in the described embodiment, the apparatus incorporates the bottle tab trimmer and bottle clamping mechanism referred to for example in FIG. 5, these parts of the apparatus could be omitted or provided separately. For example, with some types of moulded articles, it may be possible for the gripper head to engage a part of the article that is not removed later. In that case, the gripper head could release the moulded articles directly onto a discharge conveyor. In another embodiment, the bottle clamping mechanism 70 could be used to transport the bottles through a work station other than a trimmer (e.g. an inspection station).

The gripper head could "grip" the moulded articles in a different way, e.g. by suction. Also, the head could be carried by a single gripper arm rather than the two arm arrangement show in FIG. 6.

Obviously, the method of the invention could be used to take out moulded articles other than blow moulded bottles.

In accordance with the present invention there is a provided a method of taking out moulded articles from a plastic moulding machine having first and second moulding assemblies which are disposed in positions spaced along a defined axis for alternately producing said moulded articles and which include mould parts that open to release the moulded articles downwardly. The method includes the steps of: providing a single gripper head for engaging and taking down moulded articles released from both of said first and second moulding assemblies and subsequently releasing said articles; supporting the gripper head for movement alternately between first and second article engaging positions below the first and second moulding assemblies respectively, and a release position spaced from the moulding assemblies in a direction along said defined axis; and, moving said gripper head in timed relation to opening of said mould parts, in paths defined by a first horizontal direction parallel to said defined axis and a second direction which is generally vertical, said movement comprising a repeating sequence in which the gripper head moved alternately between said release position and said first article engaging position and back to said release position and then between said release position and said second article engaging position and back to said release position, and in which the gripper head moves in said second direction during at least part of its said movement in said first direction so that each path between said release position and said article engaging position is generally arcuate in shape, said movement in first and second directions being controllable to allow adjustment of the configuration of said generally arcuate paths of the gripper head and to accommodate different moulding assembly locations.

I claim:

1. Take-out apparatus for a shuttle-type plastic blow moulding machine having first and second blow moulding assemblies which are disposed in positions spaced along a defined axis for alternatively producing blow moulded articles from at least one parison and which include mould parts that open to release said moulded articles downwardly; the apparatus comprising:

a single gripper head for gripping said moulded articles released from said first and second blow moulding assemblies by a tab extending downwardly from said moulded articles;

means supporting said gripper head for movement alternatively between respective article engaging positions below said first and second blow moulding assemblies and a release position spaced from said first and second blow moulding assemblies in a direction along said defined axis;

said gripper head being adapted to grip said moulded articles by said tab at said engaging position and to release said moulded articles at said release position;

said means supporting said gripper head comprising:

first linear guide means disposed below said first and second blow moulding assemblies and extending in a first direction parallel to said defined axis; a carriage carried by said first guide means; first drive means for moving said carriage along said first guide means; second linear guide means coupling said gripper head to said carriage and extending in a second direction generally vertically with respect to said first direction; and second drive means for moving said gripper head in said second direction with respect to said carriage; said first and second drive means being infinitely variable so that the distance through which said carriage moves in said first direction and the distance through which said gripper head moves in said second direction can be controlled to allow said gripper head to take out said moulded articles alternatively from said first and second blow moulding assemblies and to accommodate different locations of said first and second blow moulding assemblies; and, a waste conveyor extending in said first direction below said first and second blow moulding assemblies for collecting waste therefrom and extending to a discharge location spaced from said first and second blow moulding assemblies.

2. Apparatus as claimed in claim 1, wherein said first linear guide means comprises a slide which extends in said first direction and on which said carriage is mounted, and wherein said first drive means comprises an endless belt having a rectilinear upper run which extends parallel to said slide, said carriage being coupled to said run, and an electric servomotor coupled to said belt for reciprocating the same and causing corresponding movement of said carriage in said first direction.

3. Apparatus as claimed in claim 1, wherein said gripper head is carried by a gripper arm which extends general vertically upwardly with respect to said gripper arm being guided for longitudinal movement in said second direction, and wherein said second drive means comprises rack and pinion means between said gripper arm and carriage, and an electric servomotor coupled to a driving pinion of said rack and pinion means for reciprocating said gripper arm in said second direction.

4. Apparatus as claimed in claim 3, wherein said gripper arm is part of a gripper arm assembly which further includes a second arm extending generally vertically upwardly from said carriage parallel to said gripper arm, and wherein said rack and pinion means is coupled to said second arm and said gripper arm so that, when the servomotor is operated, said carriage and said gripper arm move up and down together.

5. Apparatus as claimed in claim 1, wherein said gripper head includes a pair of jaws which are movable between a closed position for engaging said moulded articles and an open position for releasing said articles, and an actuator for moving said jaws between said open and closed positions.

6. Apparatus as claimed in claim 5, wherein said jaws are spring biased towards said open position, and wherein said actuator includes an air cylinder having a piston, and means coupling said piston with said jaws so that said jaws are moved to said closed position against said spring biasing when said air cylinder is actuated.

7. Apparatus as claimed in claim 1, wherein said anraratus is a selfcontained unit further including a supporting frame, said supporting frame being provided with wheels so that said apparatus can be moved as a unit, and supporting feet which can be extended to raise said supporting frame off said wheels, when said apparatus is located in a final position of use.

8. Apparatus as claimed in claim 7, further comprising a bracket carried by said supporting frame and adapted to be coupled to said shuttle-type plastic blow moulding machine for fixing said shuttle-type elastic blow machine and said apparatus in relative positions of use.

9. Apparatus as claimed in claim 1, further comprising programmable computer means for controlling said first and second drive means to select said article engaging positions, said release position of said gripper head, and said movement of said gripper head between said article engaging and release positions.

10. Apparatus as claimed in claim 9, wherein said apparatus further comprises interface means for coupling said programmable computer means of said apparatus with control means of said shuttle-type blow moulding machine so that said article engaging positions, said release position, and said movement of said gripper head between said article engaging and release positions can be automatically set.

11. Apparatus as claimed in claim 1, further including conveyor means extending from said release position to a final discharge position for said plastic articles, and bottle clamping means carried by said conveyor means and adapted to engage said moulded articles released by said gripper head at said release position and convey said moulded articles to said final discharge position.

12. Apparatus as claimed in claim 11, wherein said conveyor means comprises a pair of endless belts extending parallel to one another on opposite sides of said moulded articles, and electric servomotor means for reciprocating said belts to move said bottle clamping means between said release position and said final discharge position.

13. Apparatus as claimed in claim 12, wherein said bottle clamping means comprises first and second clamping heads having respective inner surfaces profiled to engage said moulded articles from opposite sides, and means for moving said heads between inner positions in which the heads engage said moulded articles from opposite sides, and outer positions in which said heads are spaced from one another for releasing said moulded articles.

14. Apparatus as claimed in claim 11, wherein said apparatus further comprises trimmer means at a trimming position between said release position and said final discharge position for removing said tab extending downwardly from said moulded articles as said moulded articles are moved from said release position to said final discharge position by said bottle clamping means.

15. Apparatus as claimed in claim 14, wherein said trimmer means includes first and second cutters which are movable between respective positions clear of said articles and cutting positions in which the cutters engage said tab extending downwardly from said moulded articles, said conveying means transporting said moulded articles from said release position to said final discharge position being adapted to pause at said trimming position for permitting said cutters to engage said tab.

16. Apparatus as claimed in claim 14, wherein said waste conveyor extends below said trimmer means for receiving said tab trimmed from said moulded articles.

* * * * *